United States Patent
Katz et al.

[11] Patent Number: 5,793,577
[45] Date of Patent: Aug. 11, 1998

[54] PLANAR GEOMETRY THIN FILM HEAD WITH SHAPED POLES

[75] Inventors: Eric R. Katz; Michael E. Devillier, both of San Jose, Calif.

[73] Assignee: Read-Rite Corporation, Milpitas, Calif.

[21] Appl. No.: 742,472

[22] Filed: Nov. 1, 1996

[51] Int. Cl.⁶ .................................................. G11B 5/142
[52] U.S. Cl. ................................................. 360/126
[58] Field of Search ....................................... 360/126

[56] References Cited

U.S. PATENT DOCUMENTS 5,572,392  11/1996  Aboaf ............................ 360/126

*Primary Examiner*—A. J. Heinz
*Attorney, Agent, or Firm*—Nathan N. Kallman

[57] ABSTRACT

A magnetic thin film head of the planar geometry type has a dielectric member located between facing ends of pole members in the gap region. The thickness of at least one of the pole members in the gap region is reduced by the dielectric member relative to the thickness of the remainder of the pole members. This dielectric member in the region of reduced thickness functions to increase the density of the magnetic flux in that region during recording, thereby improving the write capability of the head.

8 Claims, 2 Drawing Sheets

PLANAR GEOMETRY THIN FILM HEAD WITH SHAPED POLES

FIELD OF THE INVENTION

The present invention relates to thin film magnetic heads and in particular to magnetic heads of the planar geometry type having improved magnetic performance characteristics.

DESCRIPTION OF THE PRIOR ART

Most thin film magnetic heads currently manufactured are of the so-called "vertical" geometry type, in which the inductive recording elements are aligned generally in the same vertical plane as the recording gap. In an effort to improve several of the performance limiting characteristics of this vertical geometry, an alternate structure, of the so-called "planar" geometry type, has received attention.

A representative prior art vertical geometry thin film head 10 is shown in FIG. 1, in which numeral 11 identifies a first magnetic yoke layer member, and numeral 12 identifies a second magnetic yoke layer. The ends of layers 11, 12 are closely spaced from each other at one end to form a nonmagnetic recording gap G. The gap ends of layer 11, 12 are closely spaced from each other for a distance from the air bearing surface (ABS) 13 corresponding to the throat height distance TH, and layers 11, 12 then begin to diverge from each other. At some distance from the zero throat height dimension, yoke layer 11 may be joined by a magnetic layer 11a which, together with layer 11, forms the yoke in that region. Toward the back of the structure, layer 12 converges toward layer 11a to meet and form a back magnetic closure region.

An electrical coil represented by turns 14 is provided between layers 11a and 12 to provide a source of magnetic flux for recording magnetic signals on a recording medium located adjacent ABS 13. Additional turns 14a may be employed to provide closure for the turns structure.

In FIG. 2, a representative prior art planar geometry thin film head 20 includes a first yoke layer member 21 and second yoke layer member 22, layer 22 including separate magnetic segments 22a, 22b. Magnetically joined to segments 22a, 22b are magnetic pedestal members 23a, 23b extending up from segments 22a, 22b and having at their ends magnetic pole members 24a, 24b. The facing ends of pole members 24a, 24b are spaced from each other by a distance representing the nonmagnetic gap G. The ABS 25 extends across the upper surfaces of members 24a, 24b. An electrical coil represented by half-coil turns 26a, 26b is provided between layer members 21 and 22 to generate magnetic flux across gap G, and closure turns 26c are also employed. So-called magnetic "stud" members 28a, 28b are disposed between the ends of yoke layer members 21, 22a and between yoke layer members 21, 22b, respectively, to provide for magnetic closure of the structure.

The planar geometry head of FIG. 2 exhibits several benefits relative to the vertical geometry head of FIG. 1. First, the longer dimension of the portion of the pole faces which are in contact with the magnetic recording media in the planar geometry head reduces the "undershoots" in the electrical response during the readback process. This undershoot effect arises at the leading and trailing corners of the poles and degrades overall performance.

Additionally, by dividing the read/write coil into two half-coils, the overall inductance of the head for a given number of turns is reduced from the single-coil structure associated with the vertical geometry head. This reduction in inductance further improves the performance of the head.

Another benefit of the planar geometry head is better control over the dimensions of the structure which define the recorded track width in the magnetic recording media.

However, there is also a deficiency associated with the planar geometry head which can be understood by considering certain design features of the vertical geometry head. While a small gap distance is desirable in a recording head in order to permit use of the head at high linear storage densities, this small distance is required only in the immediate vicinity of the recording medium. Excessive areas of the two pole or yoke structures in close proximity to each other allow excessive magnetic flux to flow between them. This flux must be supplied by the magnetic circuit comprising the rest of the pole and yoke structure which is subject to magnetic saturation. By employing geometries which prevent an unnecessarily large amount of flux from flowing between the poles, the saturation effects limiting the strength of the magnetic field across the gap during the recording process can be controlled.

In order to achieve this condition, the vertical geometry head is characterized by an apex geometry where the pole and yoke of layers 11, 11a are brought apart from layer 12 starting at a short distance directly behind the gap G, as shown in FIG. 1. This allows the thickness of the poles supplying magnetic flux to the gap region to be made larger than the throat height dimension TH of the pole tips. By keeping the throat height shown in FIG. 1 sufficiently small, the saturation effects limiting the magnitude of the field flowing across the gap region can be minimized, and gap fields sufficiently large to write properly in the storage media can be generated.

The planar geometry heads currently employed do not have a corresponding apex geometry, so the thickness of the poles supplying flux to the gap regions is the same as the throat height dimension. Lapping the ABS of the head to reduce the throat height for this geometry also reduces the thickness of the poles supplying the flux to the gap region, so that the relative effect of the leakage flux paths in the vicinity of the gap becomes even more significant in limiting the maximum attainable magnetic field in the recording gap.

Because of these geometric differences between a vertical geometry head and a planar geometry head for a given gap field, the peak flux density required in the poles supplying the flux to the gap region is larger for the planar geometry head, so the maximum gap magnetic field available for a given pole material is less than in the case with a vertical geometry head. This lower available write field for a planar geometry head limits the performance characteristics of this type of head, particularly at high recording densities, where high coercivity recording media is employed.

U.S. Pat. No. 4,984,118 to Springer is directed to a thin film head in which the lower surfaces of the magnetic pole material in the gap region are undercut or "underbeveled" to produce a reduced thickness, and the magnetic surfaces away from the gap are made nonparallel to the plane of the gap. This is said to reduce or eliminate undershoot resulting from spurious magnetic signals produced from magnetic surfaces parallel to the gap surfaces.

U.S. Pat. No. 5,195,006 to Morikawa discusses a magnetic head fabrication process in which pole members are made thinner in a region near the gap, and a nonmagnetic void is formed in the magnetic structure below and on either side of the gap. In Morikawa, the pole pieces of the structure are formed in relatively large sections as in conventional thin film heads. Additionally, Morikawa suggests that the region where the poles are thin extend from 1 to 7 µm along the track length direction in the vicinity of the gap. However, calculations show that a beneficial effect from this shaping requires that the thin pole region be restricted to no more than about a 4 µm region near the gap. A larger region than this allows the thin element to saturate too far away from the gap; flux leakage across these long thin poles prevents sufficient magnetic flux from reaching the gap, thereby reducing or eliminating the desired effect.

SUMMARY OF THE INVENTION

This invention provides structure in a planar geometry head that includes a nonmagnetic dielectric member deposited across the track width of the head in the region of the gap, prior to the deposition of one or both of the pole members. The dielectric member functions to decrease the amount or thickness of the magnetic material in the poles in the gap region, thereby resulting in increased magnetic flux density in the write gap without requiring excessive lapping of the ABS.

DESCRIPTION OF THE PREFERRED EMBODIMENT

Figure 1:
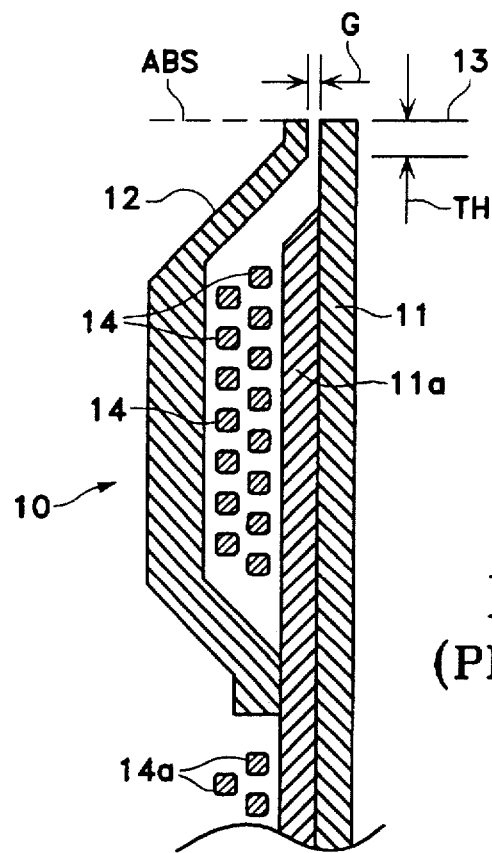
FIG. 1 is a cross-sectional elevational view of a prior art thin film head employing vertical geometry.
Figure 2:
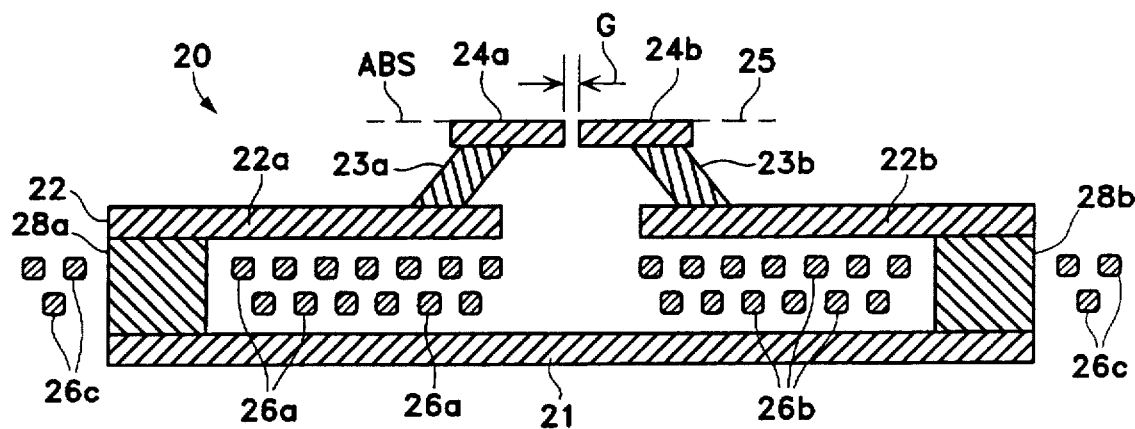
FIG. 2 is a cross-sectional elevational view of a prior art thin film head employing planar geometry.
Figure 3:
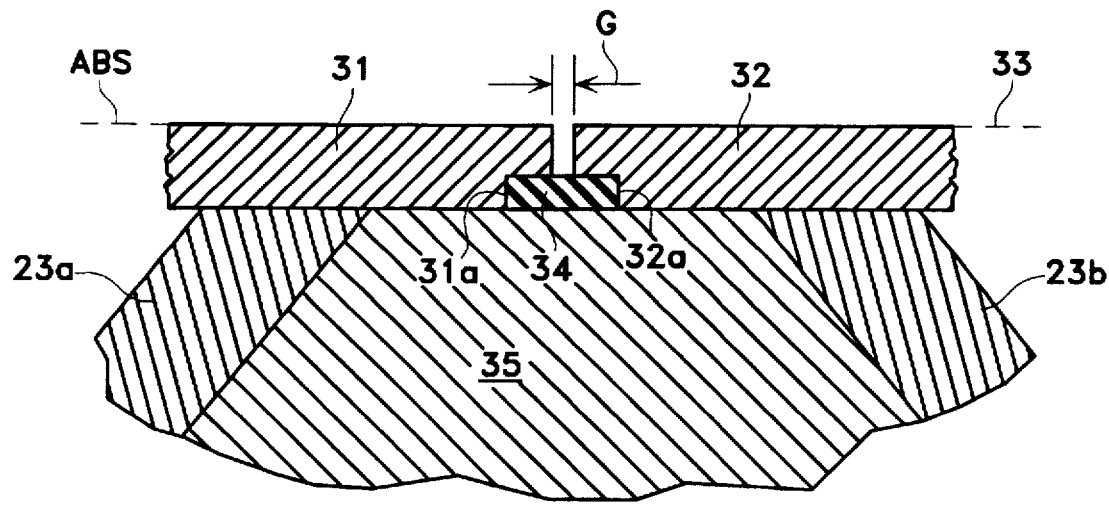
FIG. 3 is a cross-sectional elevational view of a portion of one embodiment of the present invention showing details of the gap region.

FIG. 3 shows a portion of one embodiment of the present invention of a planar geometry thin film head in which the novel gap structure is disposed on pedestal members 23a, 23b similar to these members shown and described in connection with the prior art planar geometry head of FIG. 2.

In fabricating the novel gap structure of this invention, a dielectric member 34 is deposited in the portion of the structure reserved for the gap region. Dielectric member 34 is deposited on dielectric material 35 which is placed to form the interior between pedestal members, pole members and dielectric member 34. Dielectric material 35 may be of the same composition as dielectric member 34, such as $Al_2O_3$, or may be of a different dielectric material. Dielectric member 34 may be deposited by any suitable technique such as RF (radio frequency) sputtering or the like. The deposited member 34 is then shaped to the desired dimensions through the use of conventional thin film processes such as photolithography, chemical etching, ion beam etching or the like. In the embodiment of FIG. 3, member 34 is shown rectangular in cross-section.

Following this, magnetic pole members 31, 32, along with the gap, are deposited in magnetic contact with pedestal members 23a, 23b and overlying shaped dielectric member 34. The facing surfaces of members 31, 32 are spaced from each other to define the nonmagnetic recording gap G and the ABS 33. The lower portions of pole members 31, 32 away from ABS 33 are reduced in thickness in the area of gap G and adjacent thereto as a result of dielectric member 34. This thickness reduction is represented by step portions 31a, 32a in members 31, 32, respectively, formed by the configuration of member 34.

Figure 4:
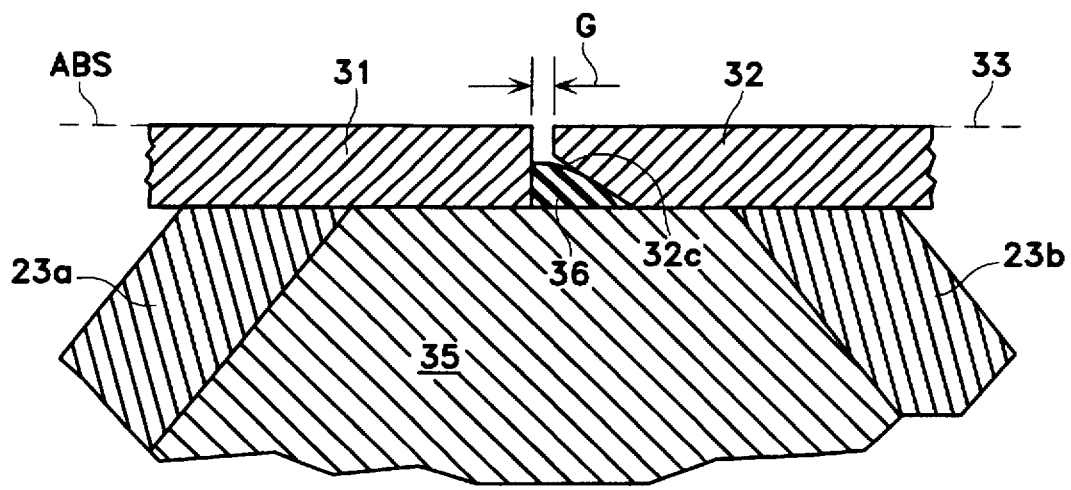
FIG. 4 is a cross-sectional elevational view of a portion of an alternate embodiment of the invention showing the gap region.

In the embodiment of FIG. 4, the facing surfaces of pole members 31, 32 again define the nonmagnetic recording gap G and ABS 33. In FIG. 4, a dielectric member 36 is deposited and shaped as shown. Because of the configuration of member 36, when members 31, 32 are deposited on the shaped member 36, only member 32 has a stepped portion 32c in the lower portion thereof in an area adjacent to gap G, this stepped portion being rounded or tapered in the configuration of dielectric member 36.

The net effect of this feature in the embodiments of both FIGS. 3 and 4 is to effectively increase the cross-sectional area of the pole material supplying flux to the gap region in comparison to the actual cross-sectional area of the gap region itself. Therefore, for a given flux-carrying capability of the magnetic poles, the actual area of the gap is reduced so that the flux density in the gap is increased. It is this flux density inside the gap area which defines the write capability of the head, so by adding the dielectric structure described, the write capability of the planar geometry head is improved.

In the present invention, the poles near the ABS do not need to be laminated in order to form the desired structure, although they could be laminated, if desired, to improve the high frequency performance characteristics. The present process is less complicated than that of the prior art, and can result in better dimensional control than the Morikawa process described above.

What is claimed is:

1. A magnetic thin film head comprising:
    a first magnetic layer;
    a single planar second magnetic layer spaced from said first magnetic layer and magnetically linked thereto;
    said second magnetic layer having two coplanar spaced portions therein and a nonmagnetic transducing gap between said spaced portions, said spaced portions and said gap being located at an air bearing surface;
    a dielectric member located in said gap between said spaced portions of said second magnetic layer and extending into at least one of said spaced portions;
    the thickness of said single planar second layer in at least one of said spaced portions in the region thereof adjacent to said dielectric member being less than the thickness of said second layer in regions thereof away from said dielectric members wherein the cross-sectional area of said portions of said single planar second magnetic layer is greater than the cross-sectional area of said gap, so that magnetic flux density in said gap is increased during the write mode.

2. A thin film head in accordance with claim 1 in which said dielectric member extends into said spaced portions of said second layer.

3. A magnetic thin film head in accordance with claim 2 in which said dielectric member is rectangular in cross-section.

4. A magnetic thin film head in accordance with claim 2 in which said dielectric member is tapered in cross-section.

5. A magnetic thin film head in accordance with claim 1 in which said dielectric member is rectangular in cross-section.

6. A magnetic thin film head in accordance with claim 1 in which said dielectric member is tapered in cross-section.

7. A magnetic thin film head as in claim 1, including pedestal members disposed adjacent to and in contact with said spaced portions of said second magnetic layer.

8. A magnetic thin film head as in claim 7, including dielectric material disposed between said pedestal members and adjacent to said dielectric member.

* * * * *